US011775577B2

(12) United States Patent
Nakashima et al.

(10) Patent No.: US 11,775,577 B2
(45) Date of Patent: Oct. 3, 2023

(54) ESTIMATION DEVICE, MOVABLE BODY, ESTIMATION METHOD, AND COMPUTER PROGRAM PRODUCT

(71) Applicant: KABUSHIKI KAISHA TOSHIBA, Minato-ku (JP)

(72) Inventors: Ryo Nakashima, Kawasaki (JP); Akihito Seki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 408 days.

(21) Appl. No.: 17/000,605

(22) Filed: Aug. 24, 2020

(65) Prior Publication Data

US 2021/0279908 A1 Sep. 9, 2021

(30) Foreign Application Priority Data

Mar. 3, 2020 (JP) .................... 2020-035838

(51) Int. Cl.
*G06F 16/532* (2019.01)
*G06T 7/73* (2017.01)
(Continued)

(52) U.S. Cl.
CPC .......... *G06F 16/532* (2019.01); *G06F 16/583* (2019.01); *G06F 16/587* (2019.01);
(Continued)

(58) Field of Classification Search
None
See application file for complete search history.

(56) References Cited

U.S. PATENT DOCUMENTS 10,061,324 B2 * 8/2018 Iimura ................ G05D 1/0246
2019/0220997 A1 * 7/2019 Asai .................... G01C 21/3811
(Continued)

FOREIGN PATENT DOCUMENTS

JP 6343670 B2 6/2018
JP 2020-8984 A 1/2020

OTHER PUBLICATIONS

Lepetit, V. et al., "EPnP: An Accurate O(n) Solution to the PnP Problem," International Journal of Computer Vision, vol. 81 No. 2, 2009, 12 pages.
(Continued)

*Primary Examiner* — Leon Viet Q Nguyen
(74) *Attorney, Agent, or Firm* — Oblon, McClelland, Maier & Neustadt, L.L.P.

(57) ABSTRACT

An estimation device according to an embodiment includes one or more hardware processors configured to function as a query-image-acquisition unit, a query-imaging-condition-acquisition unit, a reference-image-acquisition unit, a reference-imaging-condition-acquisition unit, a feature-amount calculation unit, and a self-position calculation unit. The query-imaging-condition-acquisition unit acquires an imaging condition of a query image. The reference-imaging-condition-acquisition unit acquires an imaging condition of a reference image. The feature-amount calculation unit calculates a query image's feature based on the reference imaging condition, and calculates a reference image's feature based on the query imaging condition. The self-position calculation unit associates the reference image with the query image based on the query feature and the reference feature, and uses a position/pose of a second imaging device capturing the reference image associ-
(Continued)

ated with the query image to calculate a self location indicating at least one of a position/pose of a first imaging device.

10 Claims, 13 Drawing Sheets

(51) Int. Cl.
*G06F 16/587* (2019.01)
*G06N 20/00* (2019.01)
*G06N 3/08* (2023.01)
*G06F 16/583* (2019.01)
*G06V 10/75* (2022.01)
*G06V 10/82* (2022.01)
*G06V 20/56* (2022.01)

(52) U.S. Cl.
CPC ............... *G06N 3/08* (2013.01); *G06N 20/00* (2019.01); *G06T 7/74* (2017.01); *G06V 10/75* (2022.01); *G06V 10/82* (2022.01); *G06V 20/56* (2022.01); *G06T 2207/30244* (2013.01)

(56) References Cited

U.S. PATENT DOCUMENTS

2020/0013188 A1 1/2020 Nakashima et al.
2020/0263994 A1* 8/2020 Lee ........................... G06T 7/74
2020/0401617 A1* 12/2020 Spiegel ................. G06V 20/56

OTHER PUBLICATIONS

Anoosheh, A. et al., "Night-to-Day Image Translation for Retrieval-based Localization," 2019 International Conference on Robotics and Automation (ICRA), May 20-24, 2019, 7 pages.
Hu, H. et al., "Retrieval-based Localization Based on Domain-invariant Feature Learning under Changing Environments," 2019 IEEE/RSJ International Conference on Intelligent Robots and Systems (IROS), Nov. 4-8, 2019, 6 pages.
Spencer, J. et al., "Same Features, Different Day: Weakly Supervised Feature Learning for Seasonal Invariance," Conference on Computer Vision and Pattern Recognition (CVPR), 2020, 10 pages.
Piasco, N. et al., "Learning Scene Geometry for Visual Localization in Challenging Conditions," 2019 International Conference on Robotics and Automation (ICRA), May 20-24, 2019, 7 pages.
Stumberg, L., et al. "GN-Net: The Gauss-Newton Loss for Multi-Weather Relocalization," 2020 IEEE International Conference on Robotics and Automation (ICRA), May 31-Aug. 31, 2020, 8 pages.
Schubert, S. et al., "Unsupervised Learning Methods for Visual Place Recognition in Discretely and Continuously Changing Environments," 2020 IEEE International Conference on Robotics and Automation (ICRA), May 31-Aug. 31, 2020, 7 pages.

* cited by examiner

| POSITION | | | POSE | | | | REFERENCE IMAGE | REFERENCE IMAGING CONDITION |
|---|---|---|---|---|---|---|---|---|
| x | y | z | q_x | q_y | q_z | q_w | | |
| 0.5 | 25.0 | 3.2 | 0.13 | 0.46 | 0.54 | 0.69 | | CLOUDY |
| 30.0 | 2.7 | 1.8 | 0.74 | 0.53 | 0.02 | 0.40 | | SUNNY |
| ... | ... | ... | ... | ... | ... | ... | ... | ... |

ESTIMATION DEVICE, MOVABLE BODY, ESTIMATION METHOD, AND COMPUTER PROGRAM PRODUCT

CROSS-REFERENCE TO RELATED APPLICATIONS

This application is based upon and claims the benefit of priority from Japanese Patent Application No. 2020-035838, filed on Mar. 3, 2020; the entire contents of which are incorporated herein by reference.

FIELD

Embodiments of the present invention relate to an estimation device, a movable body, an estimation method, and a computer program product.

BACKGROUND

A self-location estimation technology of estimating a photographing position (self location) of an image (hereinafter, referred to as a query image) photographed in a certain environment using a database of images obtained by photographing a pre-built environment has been known conventionally. For example, there is a technology of searching for an image similar to a query image from a database of an image whose photographing position is already known and making the photographing position of the searched image (hereinafter, referred to as a reference image) as a self location of a query image. In addition, there is a technology of estimating a photographing position with high accuracy by obtaining pixel-wise correspondence between a query image and a reference image and performing a geometric calculation based on the obtained correspondence.

However, the conventional technique has a problem that it is difficult to improve an accuracy of self-location estimation when there are various environmental factors.

DETAILED DESCRIPTION

Figure 1:
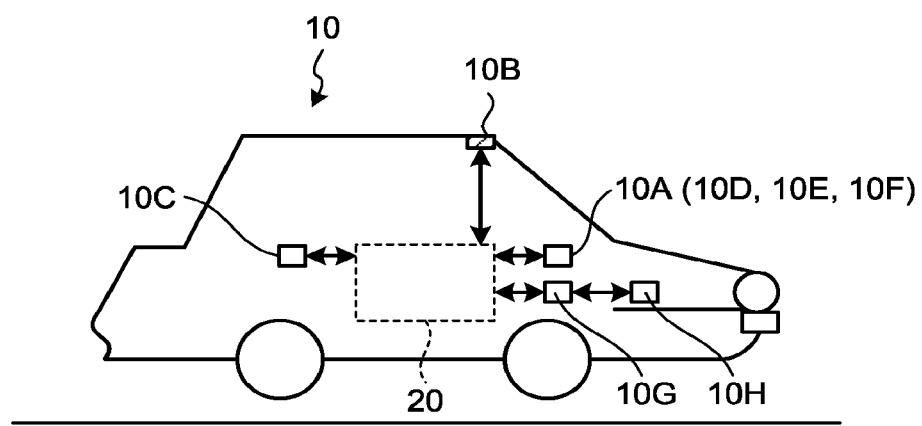
FIG. 1 is a diagram illustrating an example of a movable body according to a first embodiment.

An estimation device according to an embodiment includes one or more hardware processors configured to function as a query image acquisition unit, a query imaging condition acquisition unit, a reference image acquisition unit, a reference imaging condition acquisition unit, a feature calculation unit, and a self-position calculation unit. The query image acquisition unit acquires an image captured by a first imaging device as a query image. The query imaging condition acquisition unit acquires a query imaging condition indicating an imaging condition of the query image. The reference image acquisition unit acquires at least one reference image. The reference imaging condition acquisition unit acquires a reference imaging condition indicating the imaging condition of the reference image. The feature calculation unit calculates a query feature indicating a feature of the query image from the query image based on the reference imaging condition, and calculates a reference feature indicating a feature of the reference image from the reference image based on the query imaging condition. The self-position calculation unit associates the reference image with the query image based on the query feature and the reference feature, and uses a position and a pose of a second imaging device capturing the reference image associated with the query image to calculate a self location indicating at least one of a position and a pose of the first imaging device.

Embodiments of the estimation device, a movable body, an estimation method, and a computer program product will be described in detail below with reference to the accompanying drawings.

First Embodiment

Generally, an appearance of an image (i.e., how the image looks) varies depending on imaging conditions. For example, when an image is photographed outdoors, an appearance of the image varies depending on season, sunlight, weather, rainfall, snowfall, and the like. Even when an image is photographed indoors, an appearance of the image varies depending on a state of lights from windows, lighting equipment, and the like. Note that these changes in appearance are not limited to only a change in brightness. For example, in outdoors, there are seasonal changes such as the leafy state and the leaf color of the plant, snowfall, and so on. Even indoors, a shape or density of a shadow of an object varies depending on the lighting state. In self-position estimation, when an imaging condition of a query image and an imaging condition of a reference image are different, the appearance on the image is different even for the same feature.

When there are various environmental factors such as seasonal change, sunshine/weather change, the number of features are reduced that are not affected by the environmental factors. In such a situation, by the conventional technology, the features usable for the self-position estimation is limited to a small amount. As such, the accuracy of the self-position estimated by conventional technology is degraded.

According to a first embodiment, a case will be explained in which an estimation device that solves the above problems is mounted in a movable body.

Example of Movable Body

FIG. 1 is a diagram illustrating an example of a movable body 10 according to the first embodiment.

The movable body 10 includes an estimation device 20, an output unit 10A, a camera 10B, a sensor 10C, a power control unit 10G, and a power unit 10H.

The movable body 10 may be any available body. The movable body 10 is, for example, a vehicle, a carrier, a mobile robot, or the like. The vehicle is, for example, a motorcycle, a four-wheeled vehicle, a bicycle, and the like. In addition, the movable body 10 may be, for example, a movable body that travels by a human manipulation, or a movable body that can automatically travel (autonomous travel) without a human manipulation. In addition, the movable body 10 is not limited to a vehicle, and may be any device as long as the movable body 10 itself can move or can be carried by such as a person and a robot. For example, the movable body 10 may be a ship or a flying object such as a drone.

The estimation device 20 is realized by, for example, dedicated or general-purpose computer hardware. The estimation device 20 estimates a self location indicating at least one of a position and a pose of the camera 10B (the movable body 10).

Note that the estimation device 20 need not be mounted on the movable body 10. The estimation device 20 may be mounted on a stationary object. The stationary object is an immovable object such as an object fixed to a ground. The stationary object fixed to the ground is, for example, a guard rail, a pole, a parked vehicle, a road sign, or the like. Further, for example, the stationary object is an object that is stationary against the ground. Further, the estimation device 20 may be mounted in a cloud server that executes processing on a cloud system.

The power unit 10H is a driving device mounted on the movable body 10. The power unit 10H is, for example, an engine, a motor, a wheel, and the like.

The power control unit 10G controls the power unit 10H. The power unit 10H is driven by controlling of the power control unit 10G.

The output unit 10A outputs information. According to the first embodiment, the output unit 10A outputs estimation result information indicating the self location estimated by the estimation device 20, for example.

The output unit 10A includes, for example, a communication function of transmitting the estimation result information, a display function of displaying the estimation result information, and a sound output function of outputting a sound indicating the estimation result information. The output unit 10A includes, for example, at least one of a communication unit 10D, a display 10E, and a speaker 10F. According to the first embodiment, the output unit 10A will be described by taking a configuration including the communication unit 10D, the display 10E, and the speaker 10F as an example.

The communication unit 10D transmits the estimation result information to another device. For example, the communication unit 10D transmits the estimation result information to another device via a communication line. The display 10E displays information on the estimation result. The display 10E is, for example, a liquid crystal display (LCD), a projection device, a light, or the like. The speaker 10F outputs a sound indicating the information on the estimation result.

According to the first embodiment, the camera 10B is a monocular camera. Note that the number of cameras 10B may be arbitrary. The camera 10B may be, for example, a stereo camera, a depth camera, an omnidirectional camera, a fish-eye camera, an infrared camera, or the like. Further, the captured image may be a color image composed of three channels of RGB, or may be a one-channel gray-scale image. The camera 10B captures time-series images around the movable body 10. The camera 10B captures time-series images, for example, by capturing the periphery of the movable body 10 in time series. The periphery of the movable body 10 is, for example, an area within a predetermined range from the movable body 10. This range is, for example, a range in which the camera 10B can capture an image.

According to the first embodiment, a case where the camera 10B is installed so as to include the front of the movable body 10 as a photographing direction will be described as an example. That is, according to the first embodiment, the camera 10B images the front of the movable body 10 in time series.

The sensor 10C is a sensor that measures measurement information. The measurement information includes, for example, a speed of the movable body 10 and a steering angle of a steering wheel of the movable body 10. The sensor 10C is, for example, an inertial measurement unit (IMU), a speed sensor, a steering angle sensor, or the like. The IMU measures measurement information including a three-dimensional acceleration and a three-dimensional angular velocity of the movable body 10. The speed sensor measures a speed from the amount of rotation of a tire. A steering angle sensor measures a steering angle of a steering wheel of the movable body 10.

Next, an example of the functional configuration of the movable body 10 according to the first embodiment will be described in detail.

Example of Functional Configuration

Figure 2:
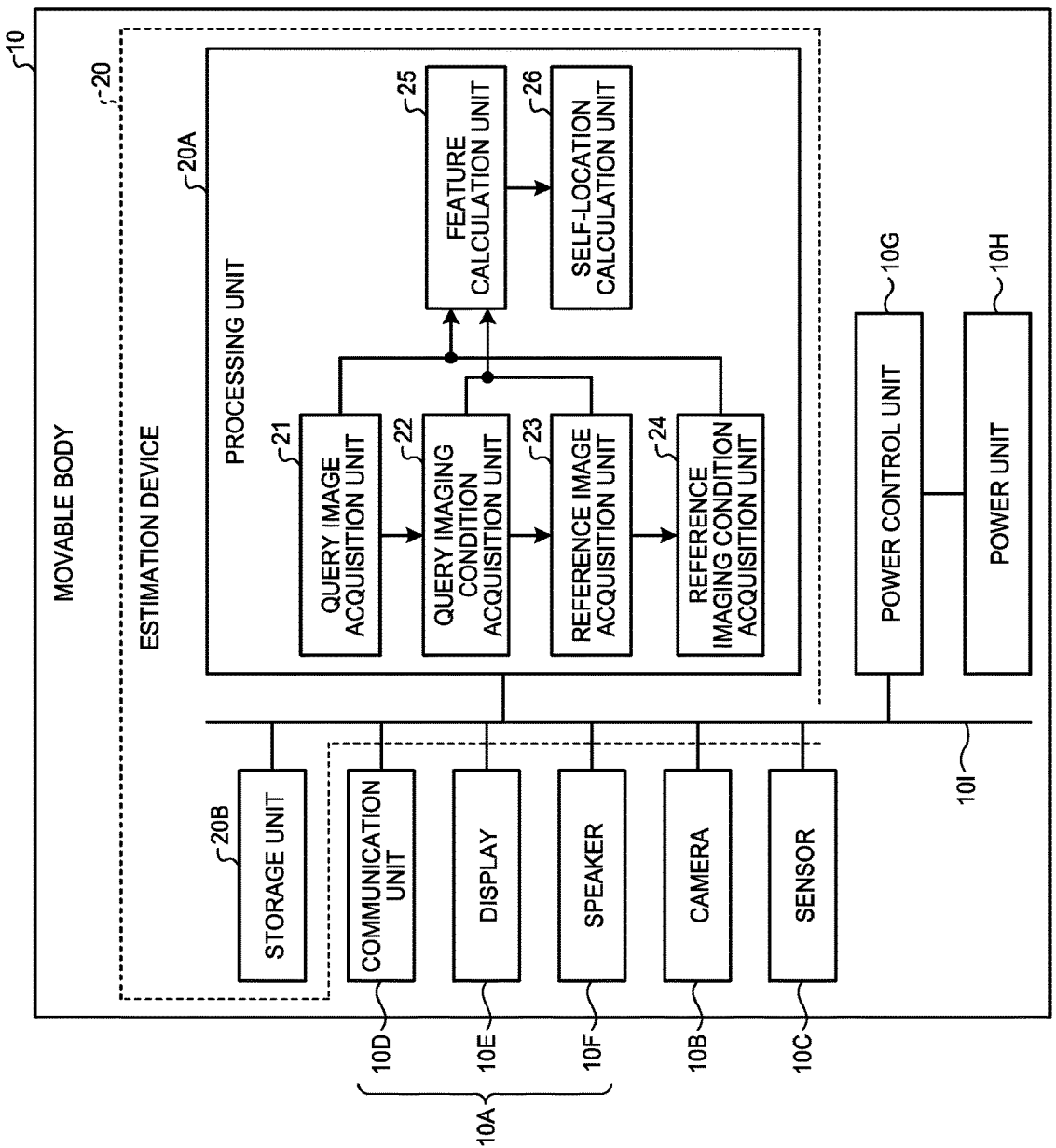
FIG. 2 is a diagram illustrating an example of a functional configuration of the movable body according to the first embodiment.

FIG. 2 is a diagram illustrating an example of a functional configuration of the movable body 10 according to the first embodiment.

The movable body 10 includes the estimation device 20, the output unit 10A, a camera 10B, a sensor 10C, the power control unit 10G, and the power unit 10H. The estimation device 20 includes a processing unit 20A and a storage unit 20B. The output unit 10A includes the communication unit 10D, the display 10E, and the speaker 10F.

The processing unit 20A, the storage unit 20B, the output unit 10A, the camera 10B, the sensor 10C, and the power control unit 10G are connected to each other via a bus 10I. The power unit 10H is connected to the power control unit 10G.

Note that the output unit 10A (the communication unit 10D, the display 10E, and the speaker 10F), the camera 10B, the sensor 10C, the power control unit 10G, and the storage unit 20B may be connected to each other via a network. A communication system of the network used for the connection may be a wired system or a wireless system. Further, the network used for the connection may be realized by combining the wired system and the wireless system.

The storage unit 20B stores information. The storage unit 20B is, for example, a semiconductor memory device, a hard disk, an optical disk, or the like. The semiconductor memory device is, for example, a random access memory (RAM), a flash memory, or the like. Note that the storage unit 20B may be a storage device provided outside the estimation device 20. In addition, the storage unit 20B may be a storage medium. Specifically, the storage medium may be one in which programs or various types of information are downloaded and stored or temporarily stored via a local area network (LAN), the Internet, or the like. Further, the storage unit 20B may be constituted by a plurality of storage media.

The processing unit 20A includes a query image acquisition unit 21, a query imaging condition acquisition unit 22, a reference image acquisition unit 23, a reference imaging condition acquisition unit 24, a feature calculation unit 25, and a self-location calculation unit 26. The query image acquisition unit 21, the query imaging condition acquisition unit 22, the reference image acquisition unit 23, the reference imaging condition acquisition unit 24, the feature calculation unit 25, and the self-location calculation unit 26 are realized by, for example, one or more processors.

The processing unit 20A may be realized by causing a processor such as a central processing unit (CPU) to execute a program, that is, by software. Further, for example, the processing unit 20A may be realized by a processor such as a dedicated integrated circuit (IC), that is, hardware. Further, for example, the processing unit 20A may be realized by using software and hardware together.

Note that the word "processor" used in the embodiments includes, for example, a CPU, a graphical processing unit (GPU), an application-specific integrated circuit (ASIC), and a programmable logic device. The programmable logic device includes, for example, a simple programmable logic device (SPLD), a complex programmable logic device (CPLD), a field programmable gate array (FPGA), and the like.

The processor realizes the processing unit 20A by reading and executing the program stored in the storage unit 20B. Instead of storing the program in the storage unit 20B, the program may be directly incorporated in the circuit of the processor. In this case, the processor realizes the processing unit 20A by reading and executing the program incorporated in the circuit.

Next, each function of the processing unit 20A will be described.

The query image acquisition unit 21 acquires the query image captured by the camera 10B (first imaging device).

The query imaging condition acquisition unit 22 acquires the query imaging condition indicating the imaging condition of the query image. The query imaging condition includes, for example, at least one of a latitude, a longitude, a date, a time, a precipitation amount, and a snowfall amount at the time of imaging.

The reference image acquisition unit 23 acquires at least one reference image from the storage device such as the storage unit 20B. The reference image is an image including a subject such as a landscape imaged by the camera 10B. In addition, the reference image is an image in which the position and pose of the camera (second imaging device) that captures the reference image is already known. The position and pose of the camera that captures the reference image are stored in the storage unit 20B in association with the reference image, for example. Note that the camera that captures the reference image and the camera 10B that captures the query image may be the same or different.

The reference imaging condition acquisition unit 24 acquires a reference imaging condition indicating the imaging condition of the reference image. The description of the reference imaging condition is the same as that of the query imaging condition, and therefore will be omitted.

The feature calculation unit 25 calculates a query feature indicating a feature of the query image from the query image based on the reference imaging condition, and a reference feature indicating a feature of the reference image from the reference image based on the query imaging condition.

The self-location calculation unit 26 associates the reference image with the query image based on the query feature and the reference feature, and uses the position and pose of the second imaging device that captures the reference image associated with the query image to calculate the self location indicating at least one of the position and pose of the camera 10B.

Example of Estimation Method

Figure 3:
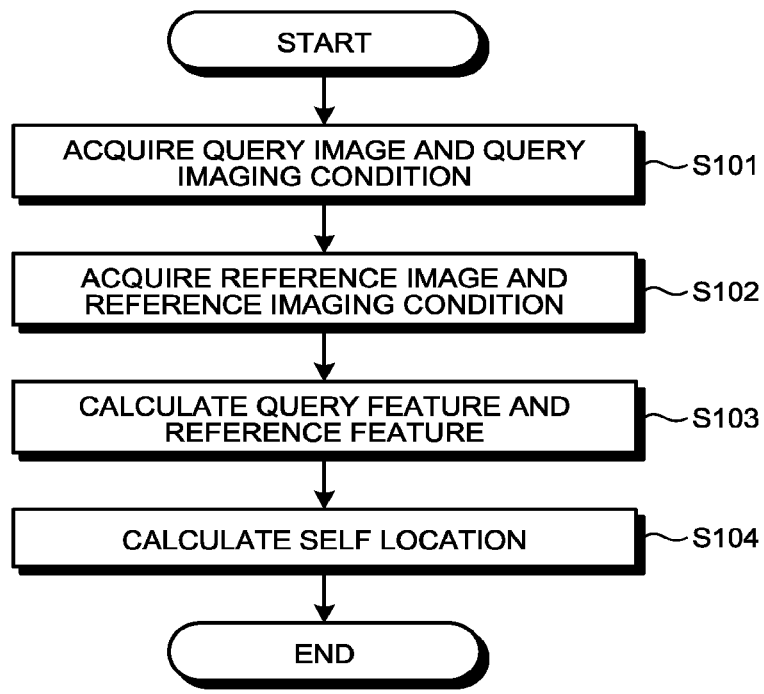
FIG. 3 is a flowchart illustrating an example of an estimation method according to the first embodiment.

FIG. 3 is a flowchart illustrating an example of an estimation method according to the first embodiment. First, an outline of processes of each step will be described.

First, the query image acquisition unit 21 acquires the query image from the camera 10B mounted on the movable body 10, and the query imaging condition acquisition unit 22 acquires the query imaging condition (step S101).

Next, the reference image acquisition unit 23 acquires at least one reference image from the storage device such as the storage unit 20B, and the reference imaging condition acquisition unit 24 acquires the reference imaging conditions (step S102).

Next, the feature calculation unit 25 calculates the query feature indicating the feature of the query image from the query image based on the reference imaging condition, and calculates the reference feature indicating the feature of the reference image from the reference image based on the query imaging condition (step S103).

Next, the self-location calculation unit 26 calculates a similarity between the query image and the reference image using the query feature and the reference feature, and calculates the self location indicating at least one of the position and pose of the camera 10B photographing the query image using the calculated similarity (step S104).

Next, details of processes in each step of FIG. 3 will be described.

Step S101

Figure 4:
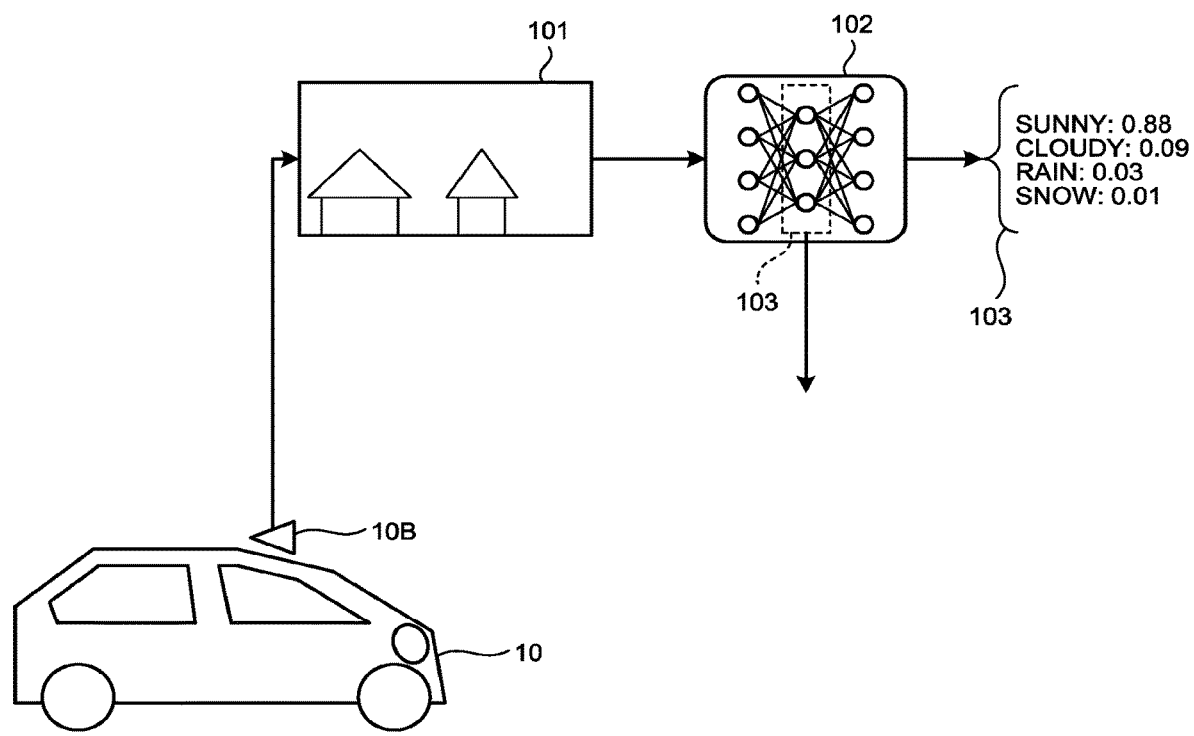
FIG. 4 is a diagram for describing an operation example of a query image acquisition unit and a query imaging condition acquisition unit according to the first embodiment.

FIG. 4 is a diagram for describing an operation example of the query image acquisition unit 21 and the query imaging condition acquisition unit 22 according to the first embodiment. The query image acquisition unit 21 acquires a query image 101 from the camera 10B mounted on the movable body 10. The camera 10B images the environment around the movable body 10 from a fixed position on the movable body 10 in a fixed pose. The camera 10B does not have to be in the fixed pose as long as a relative pose of the camera 10B with respect to the movable body 10 can be measured.

The query imaging condition acquisition unit 22 acquires a query imaging condition 103 indicating the imaging condition of the query image 101.

As the query imaging condition 103, an output of a machine-learning model 102 when the machine-learning model 102 is applied to the query image 101 or an internal state of the machine-learning model 102 may be used. As the machine-learning model 102, a neural network or a random forest can be used. When the machine-learning model 102 is used, the query imaging condition 103 is acquirable by using only the input query image 101. Note that the machine-learning model 102 may also be used in the case of acquiring the reference imaging condition, as in the case of acquiring the query imaging condition 103.

Specifically, the machine-learning model 102 is, for example, a neural network that uses the query image 101 as the input and the query imaging condition 103 as the output. The example of FIG. 4 illustrates a case where the query imaging condition 103 is weather when the query image was captured. Note that the query imaging condition 103 may be acquired by way of outputting by an intermediate layer of the neural network instead of outputting by an output layer of the neural network.

Note that the query imaging condition 103 can include not only the weather but also arbitrary information related to the change in the appearance of the query image 101. For example, the amount of cloud, the amount of rainfall, the amount of snow, and the like may be included in the query imaging condition 103 if a photographed location is outdoor. Further, the date and time when the query image 101 is photographed may be included in the query imaging condition 103. In addition, a latitude and a longitude may be included in the query imaging condition 103 because a sun altitude varies depending on a latitude and a longitude even at the same time of day and an appearance of an image varies. In addition, if a photographed location is indoor, lighting conditions and the like of lights may be included in the query imaging condition 103. As a method of representing the query imaging condition 103, either a continuous value or a discrete category such as a one-hot vector can be used. For example, when expressing a date and time, a continuous value indicating a time starting from a specific time may be set as the query imaging condition 103, and for example, four stages of morning, daytime, evening, and night, or a discretized time every hour may be used as the query imaging condition 103.

The machine-learning model 102 may be trained to estimate the query imaging condition 103, for example. Further, for example, a part of the network that is trained on an arbitrary task may be used as the machine-learning model 102. Specifically, a part of an auto-encoder, which consists of an encoder that is trained to calculate a code from the input image and a decoder that is trained to reconstruct the input image from the code, may be used as the machine-learning model 102.

Note that a method of acquiring the query imaging condition 103 is not limited to the acquisition method using the machine-learning model 102 realized by the neural network. For example, when the query imaging condition 103 is weather, the query imaging condition 103 may be acquired using weather data at the time of capturing the query image.

Step S102

The reference image acquisition unit 23 acquires, for example, a reference image and an imaging position (position and pose of a second imaging device) of the reference image from the storage unit 20B that stores a database that holds the reference image and the position and pose of the second imaging device that captures the reference image in association with each other. Note that the position and pose of the second imaging device are represented, for example, based on a standard coordinate system common to all the reference images. Specifically, as a method of selecting the reference coordinate system, a global coordinate system represented by a latitude and a longitude may be used, or a coordinate system using an imaging position of a specific reference image as an origin may be used.

Figure 5:
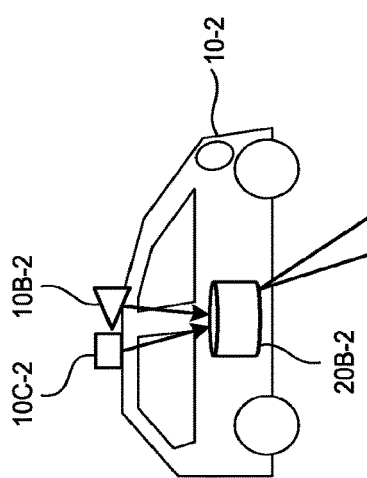
FIG. 5 is a diagram for describing an example of a DB that stores information on a reference image according to the first embodiment.

FIG. 5 is a diagram for describing an example of a database (DB) that stores information on a reference image according to the first embodiment. In the example of FIG. 5, a movable body 10-2 that acquires information on a reference image includes a camera 10B-2, a sensor 10C-2, and a storage unit 20B-2.

The camera 10B-2 acquires the reference image. The sensor 10C-2 acquires the position and pose of the camera 10B-2 (second imaging device).

The storage unit 20B-2 stores the DB that stores the information on the reference image. In the DB, the position, the pose, the reference image, and the reference imaging condition are associated with each other and stored. The position and pose indicate the position and pose of the camera 10B-2 when the reference image is captured. The reference image is an image captured by the camera 10B-2. The reference imaging condition indicates the imaging condition of the reference image (weather in the example of FIG. 5).

Here, the sensor 10C-2 is a positioning system such as a global positioning system (GPS) and a global navigation satellite system (GNSS). Further, for example, the sensor 10C-2 is an inertial sensor such as an inertial measurement unit (IMU).

In addition, in FIG. 5, a position in a three-dimensional space is represented by coordinates $(x, y, z)$ in the three-dimensional space, and a pose in the three-dimensional space is represented by a combination $(q\_x, q\_y, q\_z, q\_w)$ of quaternions representing a rotation in the three-dimensional space. However, for the representation of the position and pose, an arbitrary method of representing the position and pose represented by an arbitrary degree of freedom can be used.

For example, when it can be assumed that the movable body 10 is located on a plane, the position and pose can be represented in three degrees of freedom which is a combination of two degrees of freedom related to translation and one degree of freedom related to rotation. Further, for example, in order to represent the pose in the three-dimensional space, a rotation matrix, a pair of a vector indicating a rotation axis and scalar indicating a rotation angle, an Euler angle, or the like may be used instead of the quaternion.

Further, as another configuration method of the database, by applying a structure from motion (SfM) to a plurality of images acquired by the camera 10B-2, the position and pose of the camera 10B-2 when each reference image is captured may be estimated. In addition, as another configuration method of the database, the reference image is acquired while moving the movable body 10-2, and simultaneous localization and mapping (SLAM) is applied to the acquired reference image, so the position and pose of the camera 10B-2 when the reference image is captured may be estimated.

The reference image acquisition unit 23 may acquire all the reference images and the sets of the positions and poses in the database, or may acquire a part of the reference images and the sets of the positions and the poses in the database. For example, when there is a database of reference images obtained by imaging an inside of a multi-floor building, the entire database may be used for the self-location estimation. When acquiring advance information on a floor in which the movable body 10 such as the mobile robot exists and a room in which the movable body 10 exists, the reference image acquisition unit 23 may acquire only reference images approximating a specific floor and room and a set of positions and poses based on the advance information. Further, the reference imaging condition acquisition unit 24 acquires the reference imaging condition associated with the reference image from the database.

Step S103

The feature calculation unit 25 calculates the query feature from the query image and the reference imaging condition, and calculates the reference feature from the reference image and the query imaging condition. According to the first embodiment, the same neural network is used for the process of calculating the query feature from the query image and the reference imaging condition and the process of calculating the reference feature from the reference image and the query imaging condition. Therefore, hereinafter, the process of calculating the query feature from the query image and the reference imaging condition will be described, and the description of the process of calculating the reference feature from the reference image and the query imaging condition will be omitted.

Figure 6:
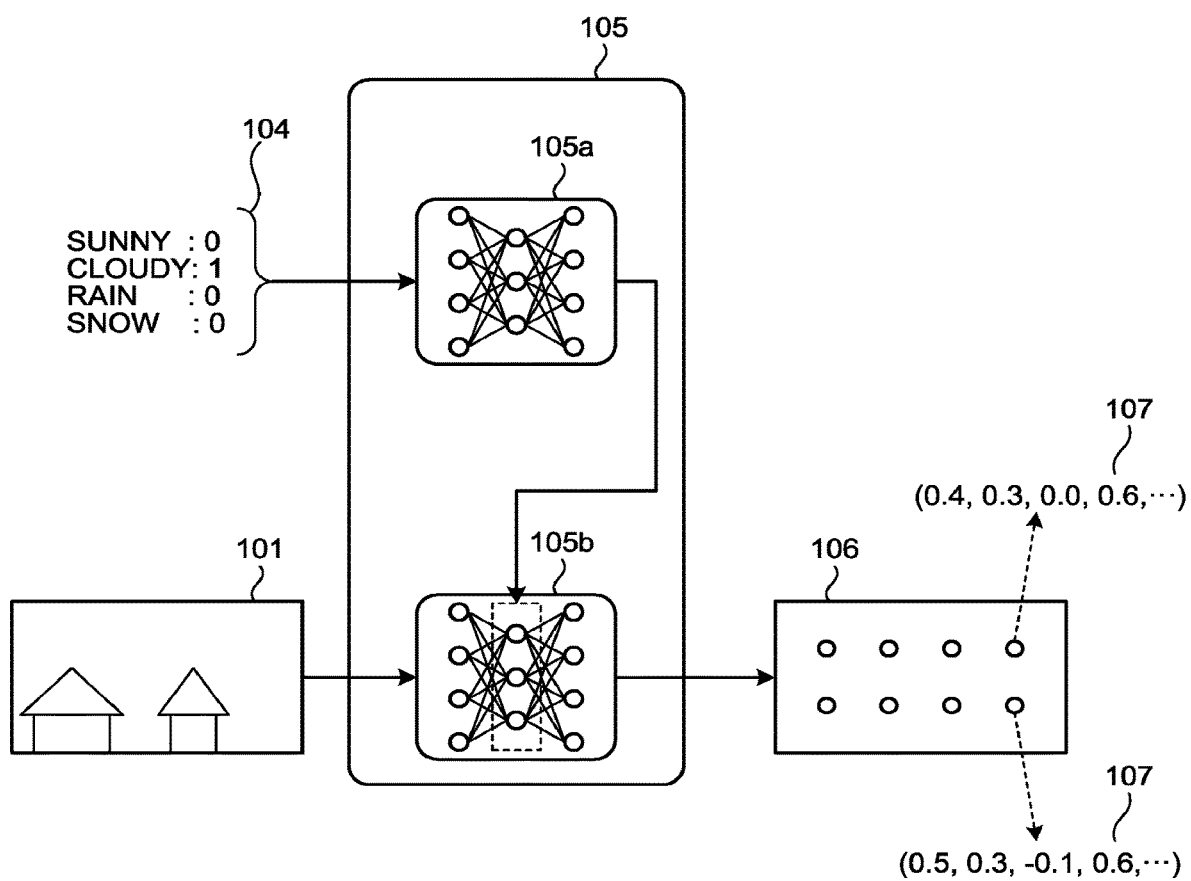
FIG. 6 is a diagram for describing an operation example of a feature calculation unit according to the first embodiment.

FIG. 6 is a diagram for describing an operation example of the feature calculation unit according to the first embodiment. The feature calculation unit 25 obtains a query feature 106 by performing an inference process using the query image 101 and a reference imaging condition 104 as the inputs to a neural network 105. According to the first embodiment, the query feature 106 is the correspondence between pixels of the query image 101 and a feature vector 107.

Note that the feature calculation unit 25 may calculate the feature vector 107 for all pixels of the query image 101, or may calculate the feature vector 107 for thinned pixels of the query image 101 at regular intervals. Further, the feature calculation unit 25 may calculate the feature vector 107 for pixels corresponding to discrete feature points detected by using a corner detection or the like.

According to the first embodiment, the neural network 105 is configured by combining a neural network 105a that uses the query image 101 as the input and a neural network 105b that uses the reference imaging condition as the input. An internal state or parameters of the neural network 105a that uses the query image 101 as the input are converted by the output of the neural network 105b that uses the reference imaging condition as the input. According to the first embodiment, a linear conversion is used as conversion. That is, the output of the neural network 105b is coefficients of the linear conversion that converts the parameters representing the internal state.

Note that a configuration of the feature calculation unit 25 according to the first embodiment is not limited to the method of FIG. 6. For example, when converting the output of the neural network 105a that uses the query image 101 as the input or the parameters representing the internal state, an arbitrary combination of a polynomial, an exponential function, a logarithmic function, a trigonometric function, and the like defined by the output of the neural network 105b can be used. For example, as another configuration method of the neural network 105, an arbitrary neural network that uses the query image 101 and the reference imaging condition 104 as the inputs can be used. Further, the feature calculation unit 25 can use an arbitrary process of outputting the query feature from the query image 101 and the reference imaging condition 104. For example, the feature calculation unit 25 may be realized by a random forest or may be realized by support vector regression.

The feature calculation unit 25 uses the reference imaging condition 104 to calculate the query feature 106. Learning by such a feature calculation unit 25 enables extracting the features common to the reference image from the query feature. Therefore, even when the imaging conditions are diverse and there are few features common to all the imaging conditions, the self-location estimation can be performed using many features that are common between the query image and the reference image, and the accuracy of the self-location estimation described in step S104 below can be improved.

As a first method of learning by the feature calculation unit 25, an image converter that outputs a new image from the query image 101 and the reference imaging condition 104 can be combined. For example, it is assumed that the query feature 106 is calculated by inputting the sunny weather query image 101 and the reference imaging condition 104 representing rainy weather into the feature calculation unit 25. At this time, when the query feature 106 and the reference imaging condition 104 representing a sunny weather are input to the image converter, the feature calculation unit 25 and the image converter learn to output a sunny weather image to which a feature equivalent to the query image 101 is reflected. On the other hand, when the query feature 106 and the reference imaging condition representing rainy weather are input to the image converter, the feature calculation unit 25 and the image converter learn to output rainy weather image to which a feature equivalent to the query image 101 is reflected. For the learning by the image converter, supervised learning or a generative adversarial networks (GAN) can be used. In addition, the image converter may learn by combining the supervised learning and the generative adversarial network.

Further, as a second method of learning by the feature calculation unit 25, the feature calculation unit 25 may be updated from the query image 101 and the reference image with different imaging conditions to make a self location estimated using a first global similarity or a local similarity calculated by a method to be described later approximate a true value.

Further, for the learning by the feature calculation unit 25, the first method and the second method described above may be combined. In the combination, for example, the feature calculation unit 25 may learn by the first method and then further may be updated by using the second method. In addition, by a method of weighting and adding loss functions, the feature calculation unit 25 may learn by simultaneously applying the first method and the second method.

Furthermore, when the reference imaging condition is given as the output of the machine-learning model 102, the feature calculation unit 25 and the machine-learning model 102 may learn at the same time. In this case, as compared with the case of learning only by the feature calculation unit 25, more parameters are updated, so that the accuracy of the self-location estimation can be further improved.

Step S104

The self-location calculation unit 26 compares the query feature with the reference feature, and calculates the first global similarity that evaluates a similarity of the entire image and the local similarity that evaluates a similarity between pixels, respectively, to calculate the self location.

Figure 7:
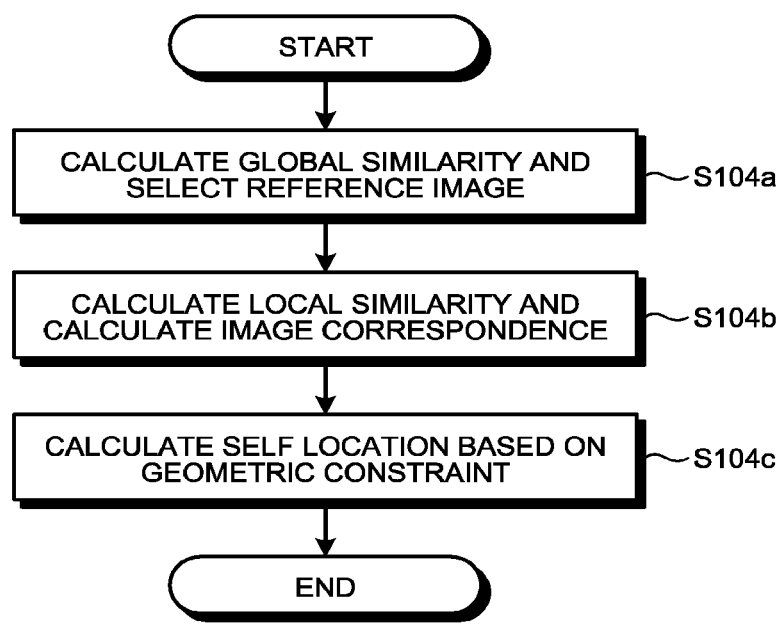
FIG. 7 is a flowchart illustrating an operation example of a self-position calculation unit according to the first embodiment.

FIG. 7 is a flowchart illustrating an operation example of the self-location calculation unit 26 according to the first embodiment. First, the self-location calculation unit 26 calculates the first global similarity between the query image 101 and the reference image, and selects the reference image whose first global similarity is greater than a first image comparison threshold (step S104a).

Next, the self-location calculation unit 26 calculates the local similarity with respect to the reference image selected in the process of step S104a, and calculates the pixels of the reference image corresponding to the pixels of the query image 101 using the local similarity (step S104b).

Next, the self-location calculation unit 26 obtains the self location of the camera 10B (first imaging device) that captures the query image 101 based on the correspondence of the pixels calculated in the process of step S104b and a geometric constraint (geometric constraint) defined by the self location of the camera 10B-2 (second imaging device) that captures the reference image (step S104c).

Next, details of processes in each step of FIG. 7 will be described.

Step S104a

Figure 8:
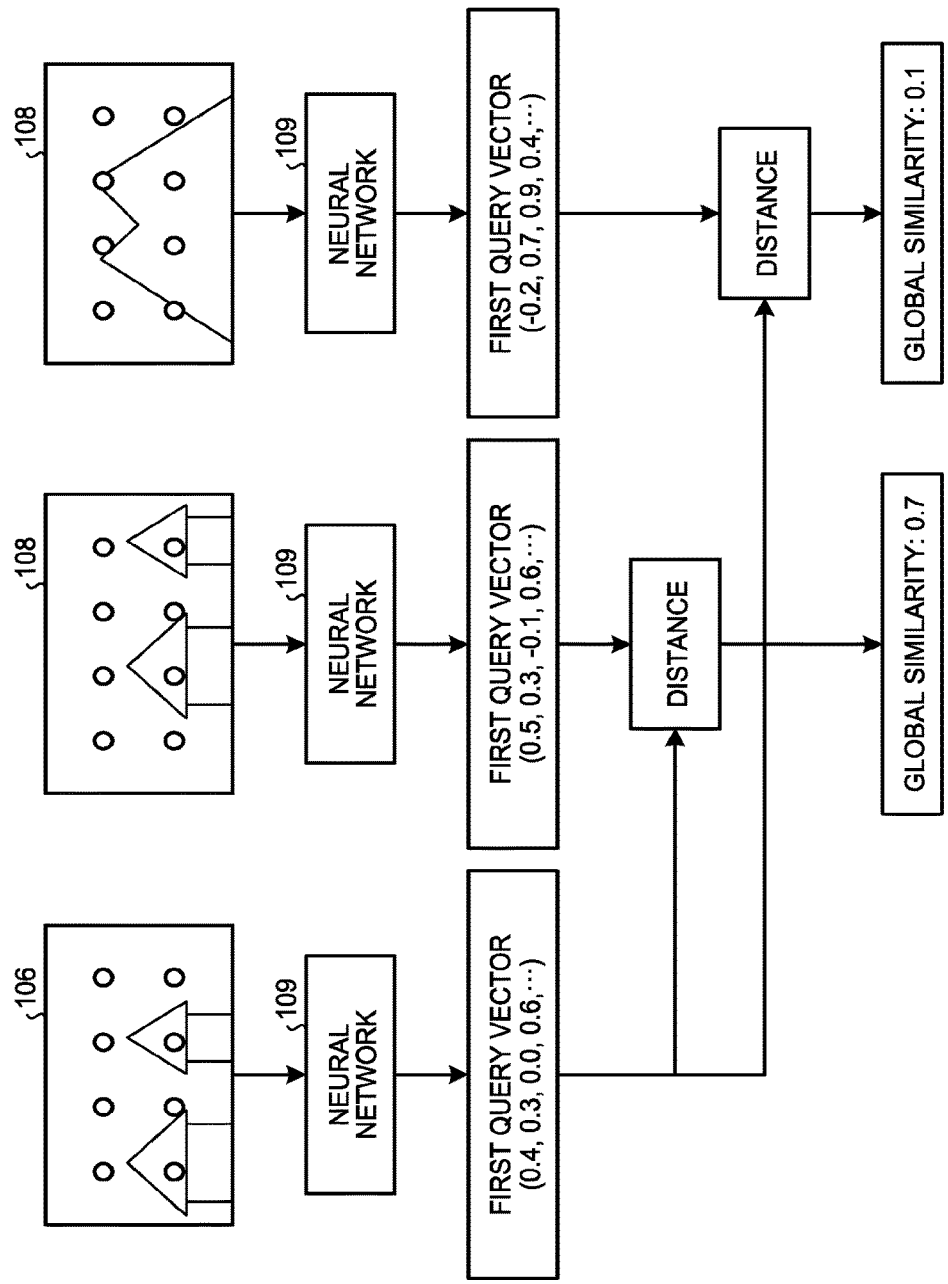
FIG. 8 is a diagram illustrating an example of a process of calculating a first global similarity according to the first embodiment.

FIG. 8 is a diagram illustrating an example of a process of calculating the first global similarity according to the first embodiment. The first global similarity indicates a similarity (the degree to which the same feature is reflected) of the entire image between the query image 101 and the reference image. The first global similarity can be calculated as follows. First, the self-location calculation unit 26 uses a neural network 109 (vector calculator) to calculate a first query vector, which is a vector representing the query image 101, from the query feature 106. Similarly, the self-location calculation unit 26 uses the neural network 109 to calculate a first reference vector representing the reference image from a reference feature 108.

Note that the neural network 109 that uses the query feature 106 or the reference feature 108 as the input and uses the first query vector or the first reference vector as the output is an example of a vector calculator. As the vector calculator, an arbitrary operation for calculating the vector from the query feature 106 and the reference feature 108 can be used. For example, the vector calculator may perform an operation (average, addition, or maximum value or the like) on the feature vector 107 for each pixel included in the query feature 106 (reference feature 108) to calculate the first query vector (first reference vector).

Next, the self-location calculation unit 26 calculates the first global similarity by comparing the first query vector with the first reference vector. As the reference for comparison, for example, a Euclidean distance between vectors is used. As the reference for comparison, a Mahalanobis distance, an inner product of the vectors, and an angle formed by the vectors may be used.

Furthermore, the self-location calculation unit 26 selects a reference image whose first global similarity calculated is large. Specifically, the self-location calculation unit 26 may select a predetermined number in descending order of the first global similarity, or may select a reference image in the first global similarity exceeding a preset first image comparison threshold.

Step S104b

Figure 9:
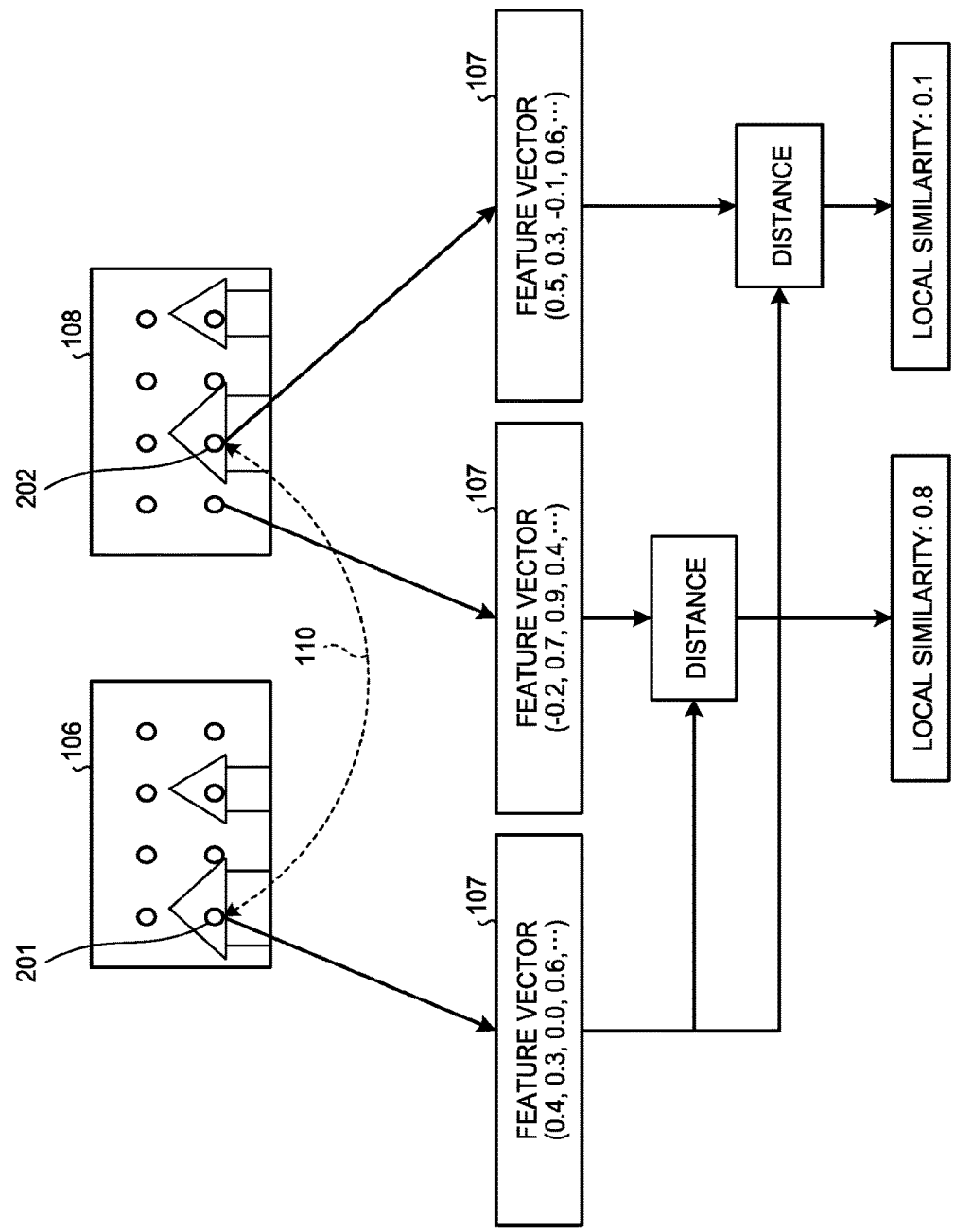
FIG. 9 is a diagram illustrating an example of a process of calculating a local similarity according to the first embodiment.

FIG. 9 is a diagram illustrating an example of a process of calculating the local similarity according to the first embodiment. The self-location calculation unit 26 calculates the local similarity between the query image 101 and the reference image selected by the process of step S104a.

The local similarity is a similarity indicating whether a pixel 201 of the query image 101 and a pixel 202 of the reference image correspond to the same feature. According to the first embodiment, the self-location calculation unit 26 calculates the local similarity by comparing the query feature 106 (feature vector 107 corresponding to the pixel 201 of the query image 101) with the reference feature 108 (feature vector 107 corresponding to the pixel 202 of the reference image). The Euclidean distance, the Mahalanobis distance, the inner product of the vectors, the angle formed by the vectors, and the like may be used for the comparison of the vectors. In addition, prior to performing the comparison, the operation of the neural network or the like may be applied to the query feature 106 and the reference feature 108.

As a result of the comparison, the self-location calculation unit 26 acquires, as an inter-pixel correspondence 110, a set of the pixel 201 of the query feature 106 having a higher local similarity and the pixel 202 having a reference feature. According to the first embodiment, the self-location calculation unit 26 acquires, as the inter-pixel correspondence 110, a set of the pixels 201 and 202 whose local similarity is larger than a certain threshold (pixel comparison threshold). Further, as a modified example, for the pixel 201 for which the query feature 106 is calculated, the self-location calculation unit 26 may acquire the pixel 202 whose local similarity is highest among the pixels 202 of the reference feature 108 as the inter-pixel correspondence 110. Further, for the pixel 202 for which the reference feature 108 is calculated, the pixel 201 whose local similarity is highest among the pixels 201 of the query feature 106 may be acquired as the inter-pixel correspondence 110. Further, the self-location calculation unit 26 may calculate the inter-pixel correspondence 110 by a plurality of methods among the above criteria, acquire only the inter-pixel correspondence 110 that simultaneously satisfies the plurality of criteria, or acquire all pixels satisfying any one of the criteria as the inter-pixel correspondence 110.

Further, as a modified example, the self-location calculation unit 26 may acquire the inter-pixel correspondence 110 from the query feature 106 and the reference feature 108 using a regression model for obtaining the inter-pixel correspondence 110.

Step S104c

Figure 10:
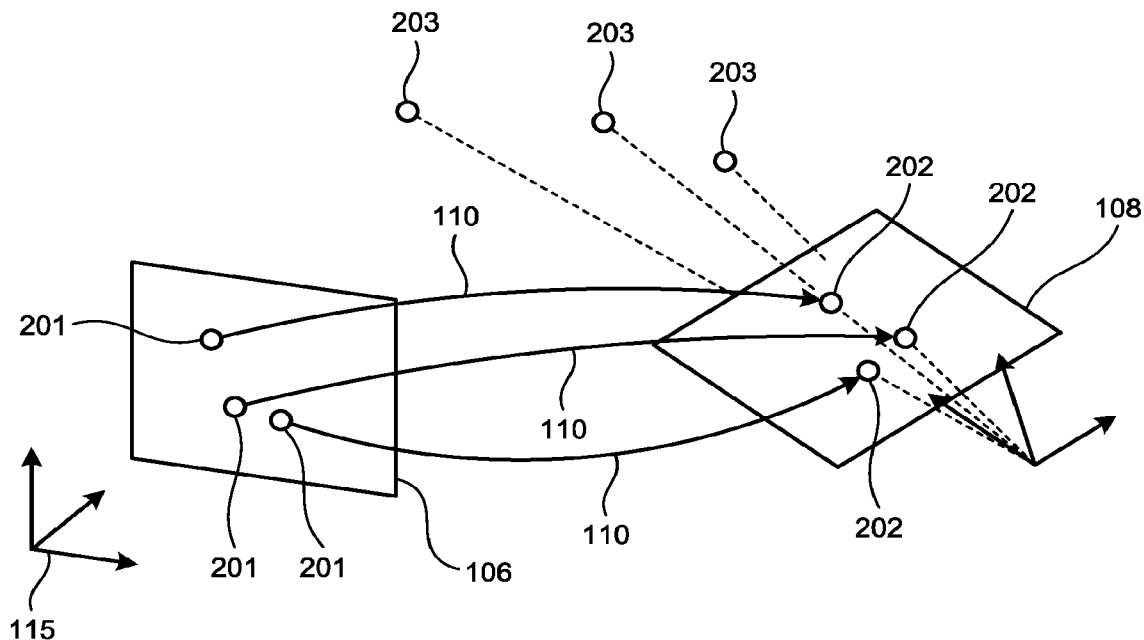
FIG. 10 is a diagram illustrating an example of a process of calculating a self location using a geometric constraint according to the first embodiment.

FIG. 10 is a diagram illustrating an example of the process of calculating the self location using the geometric constraint according to the first embodiment. According to the first embodiment, for the pixel 201 of the query feature 106, the self-location calculation unit 26 obtains the pixel 202 of the corresponding reference feature 108 by using the inter-pixel correspondence 110, and furthermore, obtains a position 203 in a space corresponding to the pixel 202 of the reference feature 108. Note that a method for obtaining a relationship between the pixel 202 of the reference feature and the position 203 in the space will be described later. The self-location calculation unit 26 obtains, as a self location 115, at least one of the position or pose of the camera 10B when the query image 101 is captured based on the geometric relationship so that the position 203 in the space is projected to a position matching a pixel 116 of the query feature.

Specifically, the self-location calculation unit 26 calculates the self location 115 of the camera 10B when the query image 101 is photographed by solving a perspective-n-point problem using, for example, a conventional method. Further, the self-location calculation unit 26 may simultaneously perform the estimation of the self location 115 of the camera 10B capturing the query image 101 and the update of the position 203 in the space or the self location of the camera 10B-2 capturing the reference image by the SfM.

Further, for example, the self-location calculation unit 26 may estimate the self location 115 of the camera 10B when the query image 101 is captured using only a part of the position 203 in the space. Further, for example, the self-location calculation unit 26 may remove outliers of the inter-pixel correspondence 110 by using least median of squares (LMedS), random sample consensus (RANSAC), or the like. By performing the LMedS, the RANSAC, or the like, the robust self-location estimation can be performed even when the outliers are included in the correspondence.

Here, a method for obtaining a relationship between the pixel 202 of the reference feature and the position 203 in the space will be described.

A first method is to acquire the position 203 in the space corresponding to the pixel 202 of the reference image when acquiring the reference image. For example, by using an RGB-D camera, the reference image and the position 203 in the space can be measured at the same time. Alternatively, the movable body 10 that acquires the reference image may be equipped with a sensor capable of measuring the surrounding three-dimensional structure such as LiDAR, and the measured three-dimensional structure may be projected onto the viewpoint of the reference image to prepare depth data. Further, the SfM or a multi-view stereo method may be applied by combining a plurality of images to which the same object as the reference image is reflected. In addition, the three-dimensional structure may be estimated from the reference image by the neural network or the like.

A second method is to use a plurality of reference images. When using a plurality of reference images, a point (pixel 202) corresponding to the pixel 201 of the query image 101 can be obtained for each reference image. The self-location calculation unit 26 can determine the position 203 of the point in the space by triangulating from these points. In the second method, it is not necessary to have depth data in association with the reference image.

Note that the self-location calculation unit 26 may determine the position 203 of the point in the space by combining a plurality of methods such as the first method and the second method.

Note that the self-location calculation unit 26 may use only one of the first global similarity and the local similarity.

The self-location calculation unit 26 may calculate the first global similarity indicating the similarity between the query image 101 and the reference image based on the query feature 106 and the reference feature 108, associate the reference image whose first global similarity is greater than the first image comparison threshold with the query image 101, and calculate the self location 115 using the position and pose of the camera 10B-2 (second imaging device) capturing the reference image associated with the query image 101. Specifically, for example, the self-location calculation unit 26 may select the plurality of reference images similar to the query image 101 using the first global similarity, and calculate the self location 115 of the query image 101 by averaging each position and pose where the selected reference image is photographed. For example, arithmetic averaging or the like can be used for averaging positions and spherical interpolation or the like can be used for averaging poses. As a result, the calculation of the local similarity is not required, so the accuracy of the self location 115 is reduced, but the calculation amount can be suppressed.

Further, for example, the self-location calculation unit 26 may be configured to use only the local similarity. That is, the self-location calculation unit 26 may calculate the local similarity indicating the similarity between the pixel 202 of the reference image and the pixel 201 of the query image 101 based on the query feature 106 and the reference feature 108, associate the pixel 202 of the reference image whose local similarity is greater than the pixel comparison threshold with the pixel 201 of the query image 101, and calculate the self location 115 using the geometric constraint defined from the associated pixels 201 and 202. In this case, the calculation amount is large because the correspondence with the query image 101 is obtained for all the reference images, but there is an advantage that the search of the reference image is unnecessary.

As described above, in the estimation device 20 according to the first embodiment, the query image acquisition unit 21 acquires the image captured by the camera 10B (first imaging device) as the query image 101. The query imaging condition acquisition unit 22 acquires the query imaging condition 103 indicating the imaging condition of the query image 101. The reference image acquisition unit 23 acquires at least one reference image. The reference imaging condition acquisition unit 24 acquires the reference imaging condition 104 indicating the imaging condition of the reference image. The feature calculation unit 25 calculates the query feature 106 indicating the feature of the query image 101 from the query image 101 based on the reference imaging condition 104, and calculates the reference feature 108 indicating the feature of the reference image from the reference image based on the query imaging condition 103. The self-location calculation unit 26 associates the reference image with the query image 101 based on the query feature 106 and the reference feature 108, and uses the position and pose of the camera 10B-2 (second imaging device) that captures the reference image associated with the query image 101 to calculate the self location 115 indicating at least one of the position and pose of the first imaging device.

As a result, with the estimation device 20 according to the first embodiment, it is possible to improve the accuracy of the self-location estimation even when there are various environmental factors. Specifically, it is possible to perform the self-location estimation using the feature common to the query image 101 and the reference image. Therefore, even if the imaging conditions are various and it is difficult to use the feature common to all the imaging conditions, the self location 115 can be accurately estimated.

Second Embodiment

Next, a second embodiment will be described. In the description of the second embodiment, description similar to that of the first embodiment will be omitted, and only different points from the first embodiment will be described. The estimation device 20 according to the second embodiment is different from the estimation device 20 according to the first embodiment in that second global similarities calculated using features that are non-dependent on the query imaging condition 103 and a reference imaging condition are combined.

Example of Functional Configuration

Figure 11:
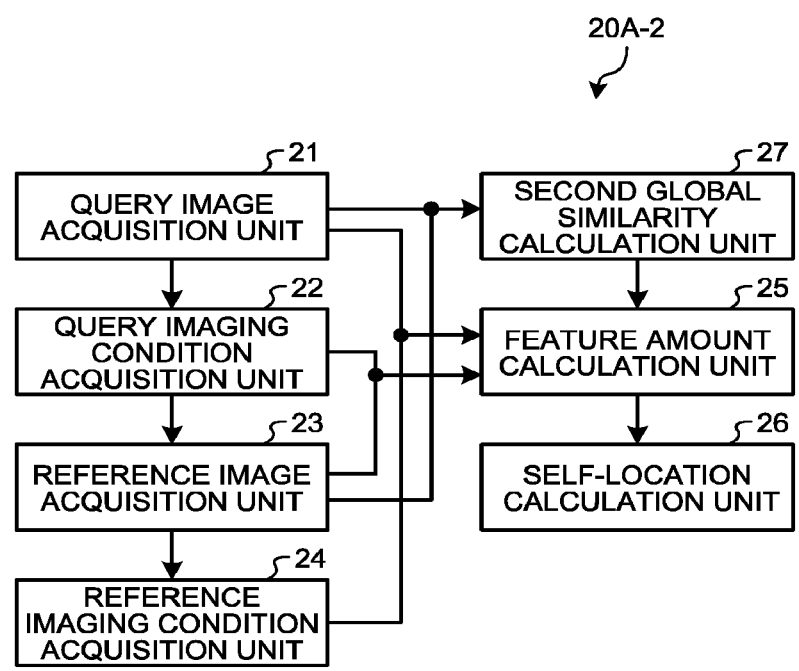
FIG. 11 is a diagram illustrating an example of a functional configuration of a processing unit according to a second embodiment.

FIG. 11 is a diagram illustrating an example of a functional configuration of a processing unit 20A-2 according to the second embodiment. The processing unit 20A-2 according to the second embodiment includes the query image acquisition unit 21, the query imaging condition acquisition unit 22, the reference image acquisition unit 23, the reference imaging condition acquisition unit 24, the feature calculation unit 25, the self-location calculation unit 26, and a second global similarity calculation unit 27.

The second global similarity calculation unit 27 calculates a second global similarity of the query image 101 and a reference image 111 which are defined based on features that are non-dependent on the query imaging condition 103 and the reference imaging condition 104.

In the second embodiment, the self-location calculation unit 26 calculates, for example, a first global similarity targeting a reference image whose second global similarity is greater than a second image comparison threshold, associates a reference image whose first global similarity is greater than a first image comparison threshold with the query image 101, and calculates a self location 115 using a position and a pose of the camera 10B-2 (second imaging device) that captures the reference image associated with the query image 101.

Example of Estimation Method

Figure 12:
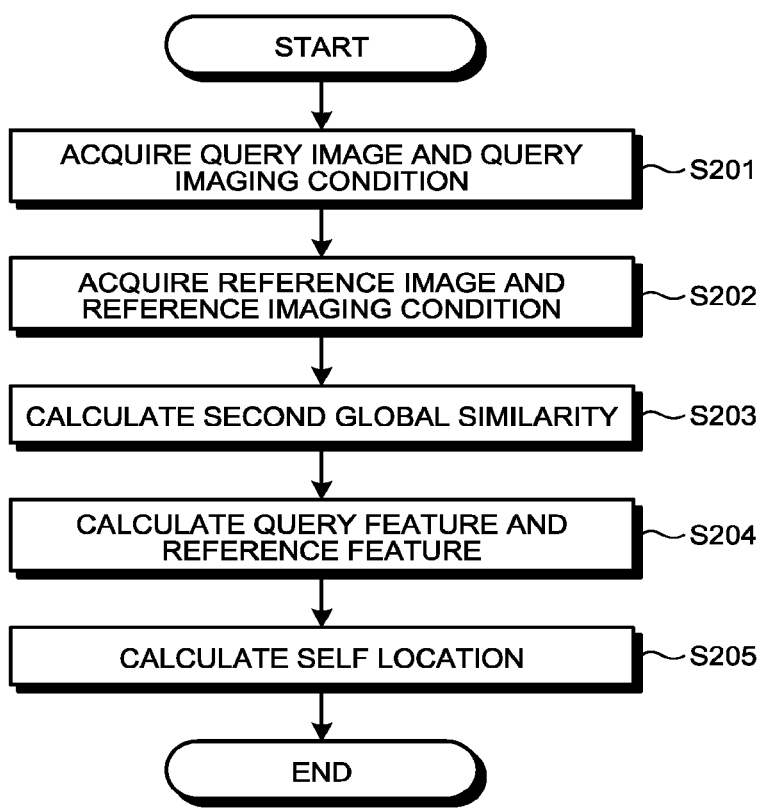
FIG. 12 is a flowchart illustrating an example of an estimation method according to the second embodiment.

FIG. 12 is a flowchart illustrating an example of an estimation method according to the second embodiment. Processes of steps S201 and S202 are the same as those of steps S101 and S102 according to the first embodiment, and therefore description thereof will be omitted.

The second global similarity calculation unit 27 calculates the second global similarity from the query image 101 and the reference image (S203).

Next, the feature calculation unit 25 calculates the query feature indicating the feature of the query image from the query image based on the reference imaging condition, and calculates the reference feature indicating the feature of the reference image from the reference image based on the query imaging condition (step S204). However, according to the second embodiment, the feature calculation unit 25 selects the reference image based on the second global similarity, and calculates the reference feature for the selected reference image, thereby making the reference images to be compared narrow down in advance.

The process of step S205 is the same as the process of step S104 according to the first embodiment, and therefore description thereof will be omitted.

Next, details of processes in steps S203 and S204 will be described.

Step S203

Figure 13:
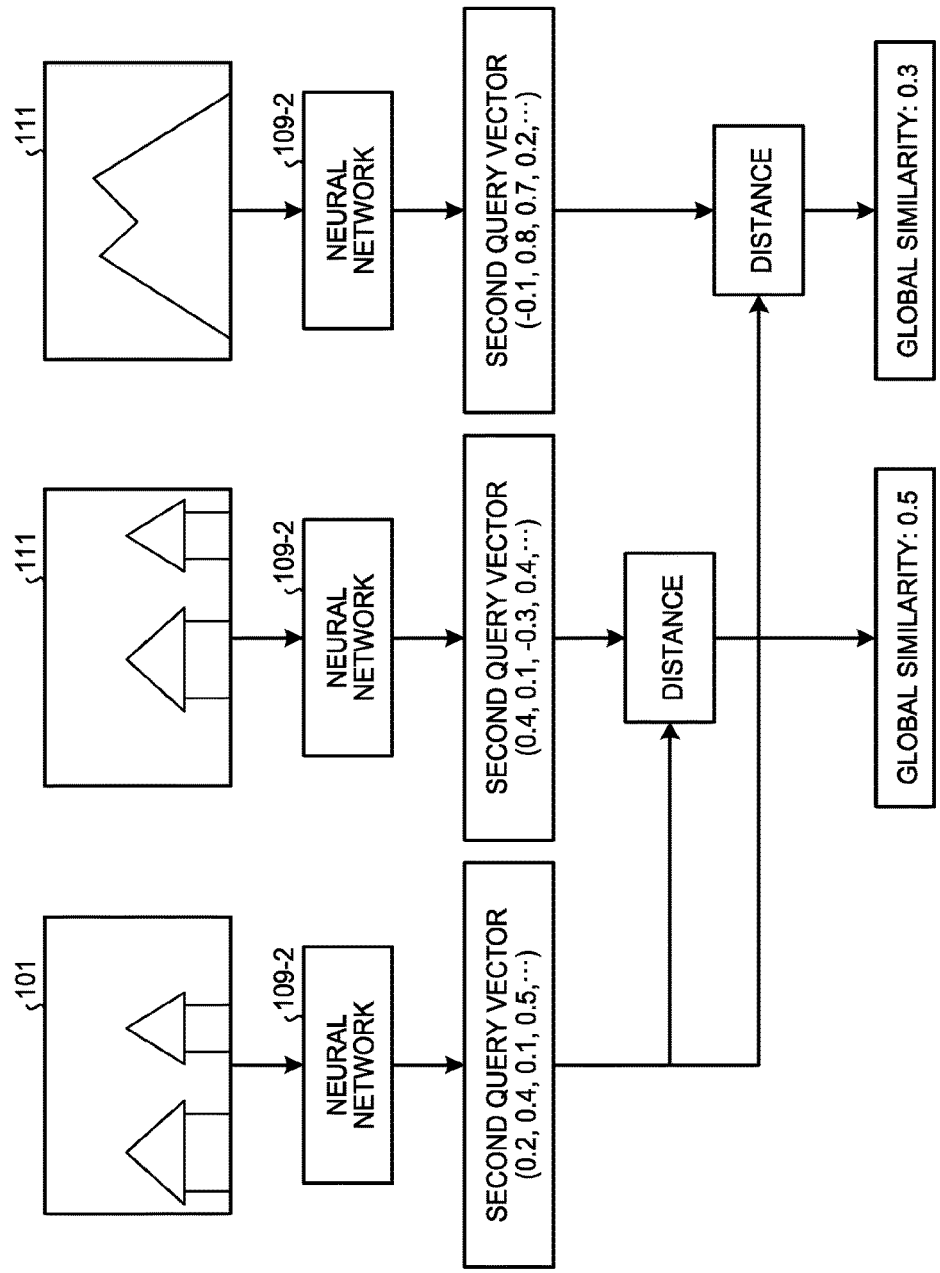
FIG. 13 is a diagram illustrating an example of a process of calculating a second global similarity according to the second embodiment.

FIG. 13 is a diagram illustrating an example of a process of calculating the second global similarity according to the second embodiment. The second global similarity calculation unit 27 applies a neural network 109-2 (second vector calculator) to the query image 101 to calculate a second query vector. Similarly, the second global similarity calculation unit 27 applies the neural network 109-2 to the reference image 111 to calculate a second reference vector. Next, the second global similarity calculation unit 27 calculates the second global similarity by comparing the second query vector with the second reference vector.

As the second vector calculator, an arbitrary operation for calculating the vector from the query image 101 and the reference image 111 can be used. According to the second embodiment, the neural network 109-2 that uses the query image 101 or the reference image 111 as the input and calculates the second query vector or the second reference vector is used as the second vector calculator. As parameters of the neural network 109-2, parameters learned in advance by tasks such as image search, object recognition, and self-encoding may be used.

The second global similarity is calculated by comparing the second query vector with the second reference vector. As the reference for comparison, for example, a Euclidean distance between vectors is used. As the reference for comparison, a Mahalanobis distance, an inner product of the vectors, and an angle formed by the vectors may be used.

Since the second reference vector is non-dependent on the query imaging condition, the second reference vector can be calculated in advance and stored in a database (the storage unit 20B). Therefore, according to the second embodiment, the feature calculation unit 25 selects the reference image based on the second global similarity and evaluates the first global similarity and the local similarity. As a result, there is no need to calculate the first global similarity for all the reference images included in the database, so the calculation amount can be reduced.

In order to further improve the efficiency of the search, for the second reference vector calculated from the reference image 111, a structure such as a K-dimensional (KD) tree and a hash such as locality sensitive hashing (LSH) are calculated in advance, and a reference image similar to the query image 101 may be selected from the second reference vector calculated in advance. In this case, the reference image 111 can be searched at higher speed.

Step S204

The feature calculation unit 25 selects the reference image 111 whose second global similarity is high from the reference images acquired by the reference image acquisition unit 23, and calculates the reference feature only for the selected image. When selecting the reference image 111 whose second global similarity is high, a predetermined number may be selected in descending order of the second global similarity, or the reference image whose second global similarity exceeds a preset second image comparison threshold may be selected.

Note that the process of calculating the reference feature from the selected reference image is the same as the process of step S103 according to the first embodiment, and therefore description thereof will be omitted.

As described above, with the estimation device 20 according to the second embodiment, it is possible to narrow down the reference images 111 for which the reference feature is calculated based on the second global similarity, and as a result, it is possible to perform the self-location estimation at high speed even when the number of reference images included in the database is large.

According to the second embodiment, similar to the first embodiment, the self-location estimation is performed by using the feature that is commonly included in the query imaging condition 103 and the reference imaging condition 104, so it is possible to improve the accuracy of the self-position estimation.

Finally, an example of the hardware configuration of the estimation device 20 according to the first and second embodiments will be described.

Example of Hardware Configuration

Figure 14:
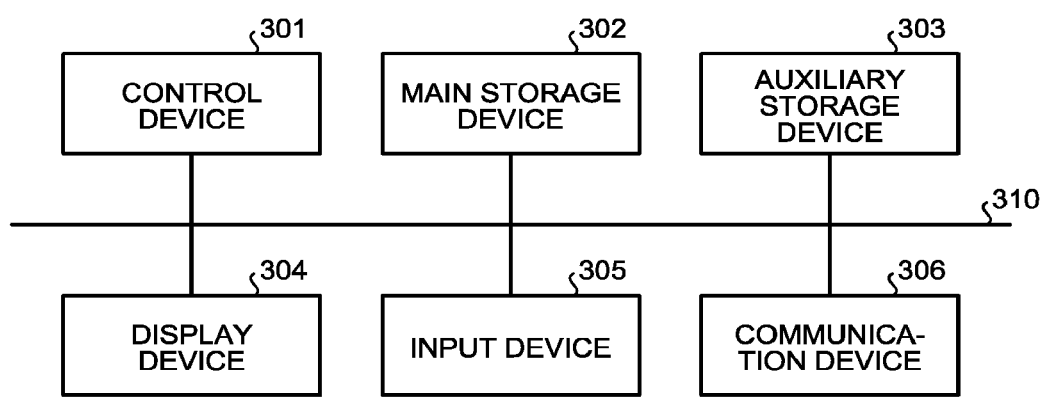
FIG. 14 is a diagram illustrating an example of a hardware configuration of the estimation device according to the first and second embodiments.

FIG. 14 is a diagram illustrating an example of a hardware configuration of the estimation device 20 according to the first and second embodiments. The estimation device 20 includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected via a bus 310.

Note that the display device 304, the input device 305, and the communication device 306 may not be provided. For example, when the estimation device 20 is connected to other devices, a display function, an input function, and a communication function of the other devices may be used.

The control device 301 executes a program read from the auxiliary storage device 303 to the main storage device 302. The control device 301 is, for example, one or more processors such as a CPU. The main storage device 302 is a memory such as a read only memory (ROM) and a RAM. The auxiliary storage device 303 is a memory card, a hard disk drive (HDD), or the like.

The display device 304 displays information. The display device 304 is, for example, a liquid crystal display. The input device 305 receives input of information. The input device 305 is, for example, a hardware key or the like. The display device 304 and the input device 305 may be liquid crystal touch panels having both a display function and an input function. The communication device 306 communicates with other devices.

The program executed by the estimation device 20 is an installable or executable file and is stored in a computer-readable storage medium such as a CD-ROM, a memory card, a CD-R, and a digital versatile disc (DVD) to be provided as a computer program product.

In addition, the program executed by the estimation device 20 may be configured to be stored in a computer connected to a network such as the Internet and provided by being downloaded via the network. Further, the program executed by the estimation device 20 may be configured to be provided via a network such as the Internet without being downloaded.

Further, the program executed by the estimation device 20 may be configured to be incorporated in a ROM or the like in advance and provided.

The program executed by the estimation device 20 has a module configuration that includes the functions that can be realized by the program among the functions of the estimation device 20.

The functions realized by the program are loaded into the main storage device 302 by allowing the control device 301 to read a program from a storage medium such as the auxiliary storage device 303 and execute the read program. That is, the functions realized by the program are generated on the main storage device 302.

Note that a part of the functions of the estimation device 20 may be realized by hardware such as an IC. The IC is a processor that executes a dedicated process, for example.

In addition, when each function is realized by using a plurality of processors, each processor may realize one of each function or two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An estimation device comprising:
one or more hardware processors configured to:
acquire an image captured by a first imaging device as a query image;
acquire a query imaging condition indicating an imaging condition of the query image;
acquire at least one reference image;
acquire a reference imaging condition indicating the imaging condition of the reference image;
calculate a query feature indicating a feature of the query image from the query image based on the reference imaging condition, and calculate a reference feature indicating a feature of the reference image from the reference image based on the query imaging condition; and
associate the reference image with the query image based on the query feature and the reference feature, and use a position and a pose of a second imaging device capturing the reference image associated with the query image to calculate a self location indicating at least one of a position and a pose of the first imaging device; and
a machine-learning model that estimates the query imaging condition and the reference imaging condition, wherein
the one or more hardware processors acquire the query imaging condition and the reference imaging condition from the machine-learning model.

2. The estimation device according to claim 1, wherein
the one or more hardware processors calculate a first global similarity indicating a similarity between the query image and the reference image based on the query feature and the reference feature, associate the reference image whose first global similarity is greater than a first image comparison threshold with the query image, and calculate the self location using the position and pose of the second imaging device capturing the reference image associated with the query image.

3. The estimation device according to claim 2, wherein the one or more hardware processors are configured to:
calculate a second global similarity between the query image and the reference image defined based on a feature that is non-dependent on the query imaging condition and the reference imaging condition; and
calculate the first global similarity targeting a reference image whose second global similarity is greater than a second image comparison threshold, associate a reference image whose first global similarity is greater than the first image comparison threshold with the query image, and calculate the self location using the position and the pose of the second imaging device capturing the reference image associated with the query image.

4. The estimation device according to claim 1, wherein
the one or more hardware processors calculate a local similarity indicating a similarity between a pixel of the reference image and a pixel of the query image based on the query feature and the reference feature, associate the pixel of the reference image whose local similarity is greater than a pixel comparison threshold with the pixel of the query image, and use a geometric constraint defined from the associated pixel to calculate the self location.

5. The estimation device according to claim 1, wherein
the query imaging condition and the reference imaging condition include at least one of a latitude, a longitude, a date, a time, a precipitation amount, and a snowfall amount at a time of imaging.

6. The estimation device according to claim 1, wherein
the machine-learning model is achieved by a first neural network, and estimates the query imaging condition and the reference imaging condition by way of outputting by an output layer of the first neural network or outputting by an intermediate layer of the first neural network.

7. The estimation device according to claim 6, wherein
the one or more hardware processors calculate the query feature indicating the feature of the query image and the reference feature indicating the feature of the reference image by a second neural network.

8. A movable body comprising:
a first imaging device that captures a query image;
one or more hardware processors configured to:
acquire the query image from the first imaging device;
acquire a query imaging condition indicating an imaging condition of the query image;

acquire at least one reference image;
acquire a reference imaging condition indicating the imaging condition of the reference image;
calculate a query feature indicating a feature of the query image from the query image based on the reference imaging condition, and calculate a reference feature indicating a feature of the reference image from the reference image based on the query imaging condition;
associate the reference image with the query image based on the query feature and the reference feature, and use a position and a pose of a second imaging device capturing the reference image associated with the query image to calculate a self location indicating at least one of a position and a pose of the first imaging device;
a machine-learning model that estimates the query imaging condition and the reference imaging condition; and
a power control device that controls a power device based on the self location, wherein
the one or more hardware processors acquire the query imaging condition and the reference imaging condition from the machine-learning model.

9. An estimation method comprising:
acquiring, by one or more hardware processors, an image captured by a first imaging device as a query image;
estimating, by a machine-learning model, a query imaging condition indicating an imaging condition of the query image;
acquiring, by the one or more hardware processors, the query imaging condition from the machine-learning model;
acquiring, by the one or more hardware processors, at least one reference image;
estimating, by the machine-learning model, a reference imaging condition indicating the imaging condition of the reference image;
acquiring, by the one or more hardware processors, the reference imaging condition from the machine-learning model;
calculating, by the one or more hardware processors, a query feature indicating a feature of the query image from the query image based on the reference imaging condition, and a reference feature indicating a feature of the reference image from the reference image based on the query imaging condition; and
associating, by the one or more hardware processors, the reference image with the query image based on the query feature and the reference feature, and using a position and a pose of a second imaging device capturing the reference image associated with the query image to calculate a self location indicating at least one of a position and a pose of the first imaging device.

10. A non-transitory computer readable medium including programmed instructions, wherein the instructions, when executed by a computer, cause the computer to:
acquire an image captured by a first imaging device as a query image;
estimate, by a machine-learning model, a query imaging condition indicating an imaging condition of the query image;
acquire the query imaging condition from the machine-learning model;
acquire at least one reference image;
estimate, by the machine-learning model, a reference imaging condition indicating the imaging condition of the reference image;
acquire the reference imaging condition from the machine-learning model;
calculate a query feature indicating a feature of the query image from the query image based on the reference imaging condition, and calculate a reference feature indicating a feature of the reference image from the reference image based on the query imaging condition; and
associate the reference image with the query image based on the query feature and the reference feature, and use a position and a pose of a second imaging device capturing the reference image associated with the query image to calculate a self location indicating at least one of a position and a pose of the first imaging device.

* * * * *